United States Patent [19]
Yoshinari et al.

[11] Patent Number: 6,017,620
[45] Date of Patent: Jan. 25, 2000

[54] MAGNETO-OPTICAL RECORDING MEDIUM

[75] Inventors: Jiro Yoshinari; Shinji Miyazaki; Hiroyasu Inoue, all of Nagano, Japan

[73] Assignee: TDK Corporation, Tokyo, Japan

[21] Appl. No.: 09/055,961

[22] Filed: Apr. 7, 1998

[30] Foreign Application Priority Data

Apr. 10, 1997 [JP] Japan ................................. 9-108091
May 12, 1997 [JP] Japan ................................. 9-137858

[51] Int. Cl.$^7$ ........................................................ B05D 3/04
[52] U.S. Cl. ................................ 428/336; 428/694 RE; 428/694 EC; 428/694 TM; 428/900
[58] Field of Search ...................... 428/694 RE, 694 EC, 428/694 TM, 900

[56] References Cited

FOREIGN PATENT DOCUMENTS

| 3-219449 | 9/1991 | Japan . |
| 6-012711 | 1/1994 | Japan . |
| WO-90/02400 | 3/1990 | WIPO . |

*Primary Examiner*—Bernard Pianalto
*Attorney, Agent, or Firm*—Laubscher & Laubscher; R. J. Lasker

[57] ABSTRACT

The invention is directed at a magneto-optical recording medium which is directly overwritable by light intensity modulation, does not require an initializing magnet, and has on the surface side of a substrate four magnetic layers, a memory layer $M_1$, a writing layer $W_2$, a switching layer $S_3$, and an initializing layer $I_4$. The magnetic layers each contain a rare earth element and a transition element, have perpendicular magnetic anisotropy at room temperature, and satisfy the relationships:

$$Tc_{I4} > Tc_{W2} > Tc_{M1} \text{ and } Tc_{I4} > Tc_{W2} > Tc_{S3}$$

wherein $Tc_{M1}$, $Tc_{W2}$, $Tc_{S3}$ and $Tc_{I4}$ are the Curie temperatures of $M_1$, $W_2$, $S_3$ and $I_4$, respectively. Writing layer $W_2$ is composed mainly of dysprosium, iron and cobalt, contains from 29–35 atomic percent of rare earth elements, and has an atomic ratio Fe/(Fe+Co) of from 0.40 to 0.58. This medium has an improved CNR, minimizes deterioration in the CNR with repeated overwriting, enhances storage reliability, and has an increased output.

14 Claims, 3 Drawing Sheets

FIG. 3

| HEAT SINK LAYER | |
|---|---|
| SECOND DIELECTRIC LAYER | |
| INITIALIZING LAYER $I_4$ | Tb-Co |
| SWITCHING LAYER $S_3$ | Tb-Fe |
| WRITING LAYER $W_2$ | Dy-Fe-Co |
| MEMORY LAYER $M_1$ | Tb-Fe-Co |
| READOUT LAYER $R_{01}$ | Gd-Fe-Co |
| FIRST DIELECTRIC LAYER | |
| SUBSTRATE | |

FIG. 4

| HEAT SINK LAYER | |
|---|---|
| SECOND DIELECTRIC LAYER | |
| INITIALIZING LAYER $I_4$ | Tb-Co |
| SWITCHING LAYER $S_3$ | Tb-Fe |
| WRITING LAYER $W_2$ | Dy-Fe-Co |
| EXCHANGE COUPLING CONTROL LAYER $C_{12}$ | Gd-Fe-Co |
| MEMORY LAYER $M_1$ | Tb-Fe-Co |
| READOUT LAYER $R_{01}$ | Gd-Fe-Co |
| FIRST DIELECTRIC LAYER | |
| SUBSTRATE | |

HIGH-POWER RECORDING $Tc_{I4} > Tc_{W2} > Tc_{M1} > Tc_{S3}$

LOW-POWER RECORDING $Tc_{I4} > Tc_{W2} > Tc_{M1} > Tc_{S3}$

MAGNETO-OPTICAL RECORDING MEDIUM

BACKGROUND OF THE INVENTION

1. Field of the Invention

The present invention relates to a light intensity-modulated direct overwrite-capable magneto-optical recording medium.

2. Prior Art

In a magneto-optical (MO) recording medium, recording (or writing) is carried out by locally heating a magnetic thin-film using laser light, for example, and reversing the direction of magnetization in this heated area with an external magnetic field. These recorded domains with their differing directions of magnetization are read out by means of the Kerr effect and the Faraday effect.

Advantages of magneto-optical recording media are their high recording density and also, unlike hard disks (a high-capacity magnetic recording medium), the easy replaceability of the medium. However, conventional magneto-optical recording media are generally not directly overwritable during rewriting. Because new information must be recorded after first erasing the recorded information, the rewriting process has been slow.

Magneto-optical recording media which are directly overwritable by light intensity modulation (sometimes referred to hereinafter as "light-modulated overwriting") are described in JP-A 175948/1987, JP-B 16993/1996, JP-B 16996/1996 and elsewhere. However, these magneto-optical recording media require that the drive be provided with an initializing magnet. Magneto-optical recording media which are capable of light-modulation overwriting without requiring an initializing magnet are described in, for example, International Publication WO 90/02400, JP No. 2503708, and JP-A 12711/1994.

A problem with light-modulated overwrite-capable magneto-optical recording media is that, as will be discussed subsequently, because two levels of recording power are used in overwriting, the recording power margin is generally narrow, and the power margin during low-power recording is especially narrow. "Recording power margin," as used herein, refers to the recording power range (breadth) at which a sufficient carrier-to-noise ratio (CNR) can be obtained. For example, if the laser power during low-power recording is too low, there is substantially no formation of record marks and incomplete erasure occurs, as a result of which the CNR becomes very low and errors increase. On the other hand, if the laser power during low-power recording is too high, an effect similar to that during high-power recording arises, as a result of which normal formation of record marks for low-power recording does not occur, likewise leading to a considerable drop in the CNR and an increase in errors.

In magneto-optical recording media drives, the laser power applied to the medium fluctuates due to such factors as individual variations in the semiconductor lasers used in optical pickups, changes with time in the semiconductor laser, and contamination of the optical pickup optics. Thus, if the medium becomes standardized at a narrow recording power margin, the allowable range in the laser power fluctuation of the drive will narrow, making it difficult to achieve lower-cost drives.

Moreover, in light-modulated overwritable magneto-optical recording media, along with increasing the recording power margin during low-power recording, there is also a need to prevent a rise in the recording power required during high-power recording.

JP-A 106744/1992 and JP-A 234158/1993 describe how to increase the recording power margin in light-modulated overwritable magneto-optical recording media.

In JP-A 106744/1992, a thermal diffusion layer composed of a metal material having a high heat conductivity is provided, either in direct contact with two magnetic thin-films or with intervening protective layers composed of a dielectric. In this reference, the thickness of the protective layers has been set at not more than 50 nm and the thickness of the thermal diffusion layer at from 2 to 50 nm. In an example provided therein, 10 nm thick protective layers made of SiN and a 20 nm thick thermal diffusion layer made of copper are formed.

JP-A 234158/1993 discloses, as in JP-A 106744/1992 above, a magneto-optical recording medium with a thermal diffusion layer, in which there has been provided, between the thermal diffusion layer and a magnetic thin-film, a thermal insulating layer composed of a dielectric. In this reference, from two to four magnetic thin-films are stacked together, and the thickness of the thermal insulating layer is from 2 to 10 times the thickness of the thermal diffusion layer. An example provided therein describes the formation, on two magnetic thin-films, of an 80 nm thick thermal insulating layer made of $SiO_2$ and a 40 nm thick thermal diffusion layer made of aluminum.

However, we found through our own research that, even when a dielectric layer (as a protective layer or a thermal insulating layer) and a thermal diffusion layer are provided as in above-mentioned JP-A 106744/1992 and JP-A 234158/1993, it is not possible to increase the recording power margin and to avoid a rise in the recording power during high-power recording.

Problems of prior-art magneto-optical recording media which do not require an initializing magnet and are light-modulation overwritable, such as the magneto-optical recording medium described in JP-A 12711/1994, are that a sufficiently high CNR cannot be obtained during overwriting, and that the CNR deteriorates with repeated overwriting.

SUMMARY OF THE INVENTION

A first object of the present invention is to improve the CNR in a magneto-optical recording medium which is directly overwritable by light intensity modulation and does not require an initializing magnet for overwriting, and also to hold down deterioration in the CNR with repeated overwriting. A second object of the invention is to both achieve the first object and enhance storage reliability. A third object of the invention is to achieve the first and second objects and also increase output.

A fourth object of the invention is to increase the recording power margin, and in particular the recording power margin during low-power recording, in a magneto-optical recording medium which is directly overwritable by light intensity modulation and does not require an initializing magnet for overwriting.

The above objects are achieved by one of the following aspects (1) to (14) of the invention.

(1) A light intensity-modulation direct overwrite magneto-optical recording medium comprising a magnetic multilayer stack on a surface side of a substrate, which magnetic multilayer stack includes four magnetic layers, these being, in order from the substrate side, a memory layer $M_1$, a writing layer $W_2$, a switching layer $S_3$, and an initializing layer $I_4$, each of said magnetic layers containing a rare earth element and a transition element and having perpendicular magnetic anisotropy at room temperature, with neighboring magnetic layers being coupled to each other by exchange coupling, wherein said magnetic layers satisfy:

$$Tc_{I4} > Tc_{W2} > Tc_{M1} \text{ and } Tc_{I4} > Tc_{W2} > Tc_{S3}; \text{ and}$$

wherein $Tc_{M1}$ is the Curie temperature of the memory layer $M_1$, $Tc_{W2}$ is the Curie temperature of the writing layer $W_2$, $Tc_{S3}$ is the Curie temperature of the switching layer $S_3$, and $Tc_{I4}$ is the Curie temperature of the initializing layer $I_4$, and the writing layer $W_2$ is composed mainly of dysprosium, iron, and cobalt, has a rare earth element content of 29 to 35 atomic percent, and has an atomic ratio Fe/(Fe+Co) of from 0.40 to 0.58.

(2) The magneto-optical recording medium of (1), wherein the memory layer $M_1$ is composed mainly of terbium, iron and cobalt, contains from 21 to 25 atomic percent of terbium, and has an atomic ratio Fe/(Fe+Co) of from 0.85 to 0.95;

the switching layer $S_3$ is composed mainly of terbium and iron, and contains from 23 to 29 atomic percent of terbium; and the initializing layer $I_4$ is composed mainly of terbium and cobalt, and contains from 21 to 28 atomic percent of terbium.

(3) The magneto-optical recording medium of (1) or (2), wherein the memory layer $M_1$ has a thickness of 10 to 40 nm, the writing layer $W_2$ has a thickness of 15 to 40 nm, the switching layer $S_3$ has a thickness of 5 to 15 nm, and the initializing layer $I_4$ has a thickness of 15 to 50 nm.

(4) The magneto-optical recording medium of any one of (1) to (3) comprising an exchange coupling control layer $C_{12}$ between the memory layer $M_1$ and the writing layer $W_2$.

(5) The magneto-optical recording medium of (4), wherein the exchange coupling control layer $C_{12}$ is a magnetic layer comprised of an amorphous alloy containing a rare earth element and a transition element.

(6) The magneto-optical recording medium of (5), wherein the axis of easy magnetization in the exchange coupling control layer $C_{12}$ is oriented in-plane at room temperature, and a temperature at which the axis of easy magnetization in the exchange coupling control layer $C_{12}$ becomes perpendicularly oriented exists within the range of from 100° C. to the Curie temperature of the exchange coupling control layer $C_{12}$.

(7) The magneto-optical recording medium of (5) or (6), wherein the exchange coupling control layer $C_{12}$ includes as primary components gadolinium, iron and cobalt, contains from 23 to 32 atomic percent of gadolinium, and has an atomic ratio Fe/(Fe+Co) of from 0.40 to 0.80.

(8) The magneto-optical recording medium of any one of (4) to (7), wherein the thickness of the exchange coupling control layer $C_{12}$ is from 5 to 30 nm.

(9) The magneto-optical recording medium of any one of (1) to (8) comprising a readout layer $R_{01}$ that is a magnetic layer between the substrate and the memory layer $M_1$, said readout layer $R_{01}$ being comprised of an amorphous alloy containing as primary components gadolinium, iron and cobalt, and coupled with the memory layer $M_1$ by exchange coupling.

(10) The magneto-optical recording medium of (9), wherein the readout layer $R_{01}$ contains from 23 to 27 atomic percent of gadolinium and has an atomic ratio Fe/(Fe+Co) of from 0.65 to 0.75.

(11) The magneto-optical recording medium of (9) or (10), wherein the readout layer $R_{01}$ has a thickness of 5 to 20 nm.

(12) The magneto-optical recording medium of any one of (1) to (11), wherein the memory layer $M_1$ contains a nonmagnetic element.

(13) The magneto-optical recording medium of (12), wherein the nonmagnetic element contained in the memory layer $M_1$ is at least one from among chromium, titanium, tantalum, molybdenum, tungsten, vanadium, zirconium, niobium, and aluminum.

(14) The magneto-optical recording medium of claim 1 comprising a first dielectric layer on the back side of said magnetic multilayer stack and comprising a second dielectric layer and a heat dissipating layer, in this order, on the surface side of the magnetic multilayer stack, wherein the heat sink layer is comprised of metal, the second dielectric layer has a thickness of 13 to 30 nm, and the heat dissipating layer has a thickness of 30 to 60 nm.

BRIEF DESCRIPTION OF THE DRAWINGS

FIG. 3 is a schematic view showing yet another embodiment of the magneto-optical recording medium of the invention.

FIG. 4 is a schematic view showing a further embodiment of the magneto-optical recording medium of the invention.

FUNCTION AND EFFECTS OF THE INVENTION

Figure 1:
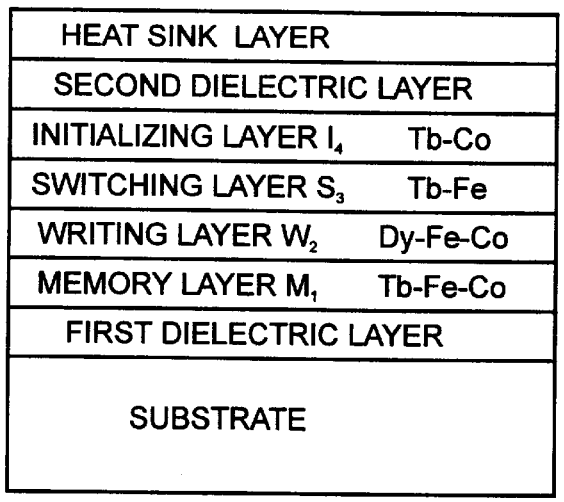
FIG. 1 is a schematic view showing an embodiment of the magneto-optical recording medium of the invention.

In the present invention, the construction of the magnetic layers in a direct overwrite capable magneto-optical recording medium is optimized, thereby achieving such effects as a higher CNR, minimal deterioration in the CNR with repeated overwrite, improved storage reliability, and higher output.

Magneto-optical recording media which, like the magneto-optical recording media of the present invention, have four magnetic layers and are light-modulation overwritable by a high-power process and a low-power process are known from the prior art, such as above-mentioned JP-A 12711/1994. However, the present invention limits the rare earth element content in the writing layer $W_2$ to at least 29 atomic percent, whereas in JP-A 12711/1994 the rare earth element content in the second magnetic layer, which corresponds to the writing layer $W_2$ in the present invention, has been set at not more than 27 atomic percent. The reason for limiting the rare earth element content of the second magnetic layer in this reference to 27 atomic percent is to set the compensation temperature lower than the copy temperature, such that the directions of magnetization for the first magnetic layer and the second magnetic layer are aligned at the time of copy and are not subject to the influence of an external magnetic field.

However, when the rare earth element content is 27 atomic percent or less, the decrease in coercivity from the compensation temperature to room temperature is too small to readily allow initialization by means of the exchange coupling received by the second magnetic layer from the fourth magnetic layer (which corresponds to the initializing layer $I_4$ in the present invention) when overwriting takes place, resulting in a considerable decline in the CNR.

The compensation temperatures of rare earth-transition alloys are reportedly determined by the ratio between the rare earth element and the transition element. However, we have found that when iron and cobalt are present as the transition elements, the compensation temperature and whether or not it exists are dependent as well on the atomic ratio Fe/(Fe+Co). Accordingly, in this invention, we have limited within the predetermined range the atomic ratio Fe/(Fe+Co) of the writing layer $W_2$, in this way making it possible to lower the compensation temperature below the copy temperature even when the rare earth element content is set at 29 atomic percent or more. Moreover, within this composition range, the coercivity can be significantly reduced from the compensation temperature down to room temperature, thereby readily enabling initialization of the writing layer $W_2$ by the initializing layer $I_4$ and making it possible to obtain a high CNR. JP-A 12711/1994 makes no mention of an atomic ratio Fe/(Fe+Co) for the second magnetic layer within the range specified in the present invention.

Above-referred International Publication WO 90/02400 describes a magneto-optical recording medium in which the magnetic layer corresponding to the writing layer $W_2$ of the present invention contains as the rare earth elements gadolinium and dysprosium, the combined content of which is 30 atomic percent. However, because the ratio Fe/(Fe+Co) in this magnetic layer is greater than the range specified in the present invention, the advantageous effects of the present invention are not achieved.

Light-modulation overwritable magneto-optical recording media are required to improve the recording sensitivity in order to reduce as much as possible the recording power required in high-power recording, and also to increase the power margin during low-power recording.

According to the present invention, in the light-modulated overwrite capable magneto-optical recording media having a magnetic multilayer stack that includes four magnetic layers on the surface side of a substrate, a second dielectric layer of a specific thickness and a heat sink layer of a specific thickness are provided on the surface side of the magnetic multilayer stack. This makes it possible to adequately increase the recording power margin during low-power recording, and also to reduce the recording power required in high-power recording.

By contrast, in the magneto-optical recording medium described in the example given in above-cited JP-A 106744/1992, because the protective layer composed of a dielectric is thinner than the second dielectric layer in the present invention, heat dissipation by the magnetic layers during writing is too rapid, resulting in a low recording sensitivity and also in too narrow a recording power margin during low-power recording. Conversely, in the magneto-optical recording medium described in above-cited JP-A 234158/1993, the thermal insulation layer is thicker than the second dielectric layer of the present invention, as a consequence of which heat dissipation from the magnetic layers is insufficient and the recording power margin during low-power recording becomes too small.

DESCRIPTION OF THE PREFERRED EMBODIMENTS

Various embodiments of the magneto-optical recording media according to the present invention are shown in FIGS. 1 to 4.

Embodiment in FIG. 1

The magneto-optical recording medium shown in FIG. 1 has a magnetic multilayer stack on the surface side of a substrate. This magnetic multilayer stack includes four magnetic layers, these being, in order from the substrate side, a memory layer $M_1$, a writing layer $W_2$, a switching layer $S_3$, and an initializing layer $I_4$. A first dielectric layer is provided on the back side of the magnetic multilayer stack (i.e., between the substrate and the magnetic multilayer), a second dielectric layer is provided on the surface side of the magnetic multilayer stack, and a heat sink layer is provided on the surface side of the second dielectric layer.

The magnetic layers making up the magnetic multilayer stack shown in FIG. 1 are comprised of amorphous alloys containing a dielectric element and a transition element, have perpendicular magnetic anisotropy at room temperature, and neighboring magnetic layers are coupled to each other by exchange coupling.

In order to carry out the light-modulated overwriting described below, it is essential that the magnetic layers satisfy:

$$Tc_{I4} > Tc_{W2} > Tc_{M1} \text{ and } Tc_{I4} > Tc_{W2} > Tc_{S3},$$

and preferably, $Tc_{I4} > Tc_{W2} > Tc_{M1} > Tc_{S3}$, wherein $Tc_{M1}$ is the Curie temperature of the memory layer $M_1$, $Tc_{W2}$ is the Curie temperature of the writing layer $W_2$, $Tc_{S3}$ is the Curie temperature of the switching layer $S_3$, and $Tc_{I4}$ is the Curie temperature of the initializing layer $I_4$.

Light-Modulated Overwriting

Light-modulated overwriting using a magneto-optical recording medium having the structure shown in FIG. 1 is described below while referring to FIGS. 5 and 6, wherein $Tc_{I4} > Tc_{W2} > Tc_{M1} > Tc_{S3}$.

Figure 5:
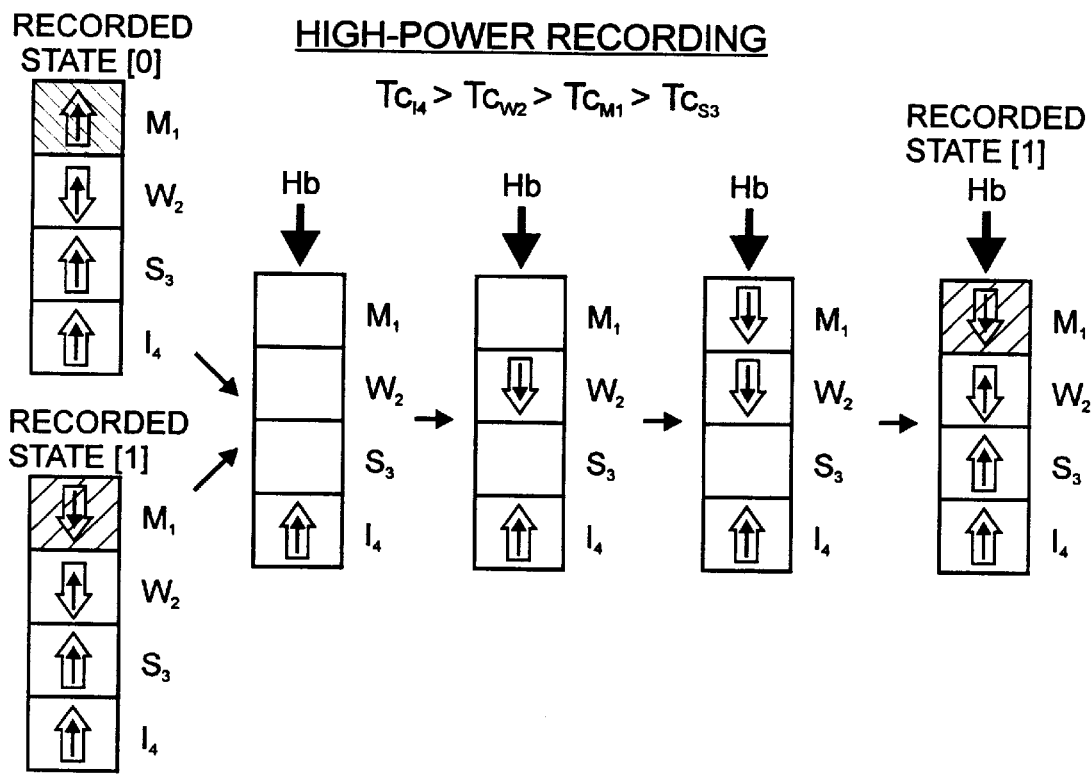
FIG. 5 is a diagram which illustrates overwriting onto the magneto-optical recording medium of the invention.
Figure 6:
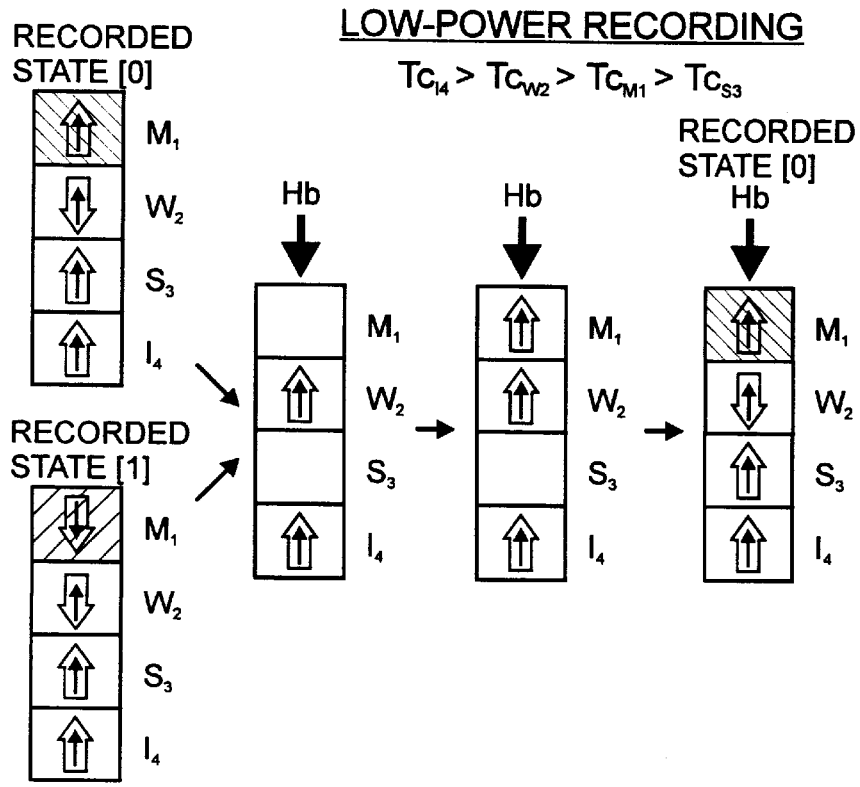
FIG. 6 is a diagram which illustrates overwriting onto the magneto-optical recording medium of the invention.

In FIGS. 5 and 6, recorded state "0" is defined as the state in which a magnetic domain having upward magnetization has been recorded in the writing layer $M_1$, and recorded state "1" is defined as the state in which a magnetic domain having downward magnetization has been recorded.

The medium on which overwriting is to be carried out is either in recorded state "0" or recorded state "1". FIG. 5 illustrates a case in which overwriting is carried out on this medium, setting it to recorded state "1", regardless of the original recorded state, and FIG. 6 illustrates a case in which the medium is set to recorded state "0", regardless of the original recorded state.

In these two diagrams, the white arrows indicate the direction of magnetization for the magnetic layer as a whole, and the black arrows indicate the direction of magnetization for transition element sub-lattices within the magnetic layer. In this invention, because the writing layer $W_2$ has a compensation temperature which is higher than room temperature, in recorded state "0" and recorded state "1", the overall direction of magnetization and the direction of magnetization for the transition element sub-lattices are mutually opposed. However, the other magnetic layers in the example shown either do not have a compensation temperature or the compensation temperature is below room temperature, and so the directions of both arrows in these other layers coincide.

Referring to FIG. 5, first a laser beam is applied, thereby raising the temperature of the magnetic multilayer stack in the irradiated region to at least $Tc_{W2}$ but less than $Tc_{I4}$, and demagnetizing the magnetic layers other than the initializing layer. As the laser beam moves, the temperature of the magnetic multilayer stack decreases. When the temperature falls below $Tc_{W2}$ but is higher than the compensation temperature of the writing layer $W_2$, the writing layer $W_2$ is magnetized downward by a bias magnetic field Hb that is being applied downward in the diagram, and the transition element sub-lattices in writing layer $W_2$ are downwardly magnetized. The bias magnetic field Hb is applied constantly during overwrite in order to avoid on-off cycling of the bias field Hb. When the temperature decreases further so that it is lower than $Tc_{M1}$ but above the compensation temperature of writing layer $W_2$, the direction of magnetization in the transition element sub-lattices in the memory layer $M_1$ becomes downward on account of exchange coupling forces with the writing layer $W_2$, resulting in recorded state "1". A further decline in temperature to below $Tc_{S3}$ and below the compensation temperature of writing layer $W_2$ results in magnetization of the switching layer $S_3$. Due to exchange coupling forces with the initializing layer $I_4$, the transition element sub-lattices in the switching layer $S_3$ become upwardly magnetized, in addition to which magnetization of the transition element sub-lattices in the writing layer $W_2$ reverses, becoming upward, because of exchange coupling forces with the switching layer $S_3$. The characteristics of the respective magnetic layers are set such that, to avoid a reversal in the magnetization of the memory layer $M_1$, the coercivity of the memory layer $M_1$ prevails, within this temperature range, over the exchange coupling forces with the writing layer $W_2$. Moreover, the characteristics of the respective magnetic layers are also set such that, in the switching layer $S_3$, the exchange coupling forces at this time are greater than the influence of the bias magnetic field.

Referring to FIG. 6, a lower-power laser beam is applied here than in the case shown in FIG. 5, thereby raising the temperature of the magnetic multilayer stack to at least $Tc_{M1}$ but less than $Tc_{W2}$, and demagnetizing both the memory layer $M_1$ and the switching layer $S_3$. Next, when the temperature of the magnetic multilayer stack falls below $Tc_{M1}$, magnetization of the transition element sub-lattices in memory layer $M_1$ becomes upward on account of exchange coupling with the writing layer $W_2$, resulting in recorded state "0". A further drop in the temperature to below $Tc_{S3}$ results in magnetization of the switching layer $S_3$, and exchange coupling forces with the initializing layer $I_4$ as well as exchange coupling forces with the writing layer $W_2$ bring about the upward magnetization of the transition element sub-lattices in switching layer $S_3$. As in FIG. 5, a bias magnetic field Hb is constantly applied in FIG. 6, but this bias field Hb has no influence on the overwriting process in FIG. 6.

In both the high-power recording case in FIG. 5 and the low-power recording case in FIG. 6, magnetization of the transition element sub-lattices in the writing layer $W_2$, the switching layer $S_3$ and the initializing layer $I_4$ is upward for each of these layers, thereby restoring the state prior to overwriting. Thus, except for the memory layer $M_1$ which determines the recorded state, the direction of magnetization for writing layer $W_2$, switching layer $S_3$, and initializing layer $I_4$ is not affected by the overwriting history. Consequently, overwriting can be repeatedly carried out by applying a low-power or high-power laser beam. In short, this means that light-modulated overwriting is possible.

As is apparent from FIGS. 5 and 6, the respective magnetic layers have the roles described below. Memory layer $M_1$ is a magnetic layer which holds information that is read by utilizing the Kerr effect. Writing layer $W_2$ is a magnetic layer which magnetizes the memory layer $M_1$ by exchange coupling forces, and thus determines the direction of memory layer $M_1$ magnetization. Switching layer $S_3$ is a magnetic layer which is provided for the purpose of shielding magnetic coupling between writing layer $W_2$ and initializing layer $I_4$ during high-power writing. Switching layer $S_3$ becomes nonmagnetic during high-power writing, as a result of which writing layer $W_2$ is magnetized in the bias magnetic field direction without being subjected to any influence by the initializing layer $I_4$. Initializing layer $I_4$ is a magnetic layer which always magnetizes in one direction and the purpose of which is to initialize writing layer $W_2$.

For the sake of simplicity, in FIG. 5, the magnetic multilayer stack is heated to at least $Tc_{W2}$ but less than $Tc_{I4}$. In reality, if writing layer $W_2$ can be aligned in the direction of the bias magnetic field, the temperature actually reached may be less than $Tc_{W2}$. Likewise, in FIG. 6, the magnetic multilayer stack is heated to at least $Tc_{M1}$ but less than $Tc_{W2}$, although in reality, if magnetization of the writing layer $W_2$ can be copied to the memory layer $M_1$, the temperature actually reached may be less than $Tc_{M1}$.

Also, in FIGS. 5 and 6, $$Tc_{I4} > Tc_{W2} > Tc_{M1} > Tc_{S3}.$$

However, as noted above, there are no strict limits on the relative magnitudes of $Tc_{M1}$ and $Tc_{S3}$. Thus, unlike in FIGS. 5 and 6, it is also possible for $Tc_{S3} > Tc_{M1}$. In this case, during the period up until the magnetization of the writing layer $W_2$ is copied to the memory layer $M_1$, so long as the exchange coupling between the switching layer $S_3$ and the writing layer $W_2$ are small, the direction of magnetization in the writing layer $W_2$ does not reverse even if the switching layer $S_3$ magnetizes; and there arises no problem. If the composition of the switching layer $S_3$ is such that the compensation temperature is close to room temperature (compensation temperature composition), the exchange energy of the switching layer $S_3$ increases when the temperature drops even further. Hence, magnetization of the writing layer $W_2$ reverses (initialization) on account of the exchange coupling with the switching layer $S_3$, thereby enabling overwriting which is not affected by the overwriting history as in the cases shown in FIGS. 5 and 6.

Magnetic Multilayer Stack

The magnetic multilayer stack in the magneto-optical recording medium of the present invention which is light-modulation overwrite capable by the foregoing process is constituted as described below.

Memory Layer $M_1$

The memory layer $M_1$ includes terbium, iron and cobalt as primary components. The terbium content of this layer is preferably 21 to 25 atomic percent, and more preferably 21 to 23 atomic percent. Too low or too high a terbium content results in a coercivity and a Curie temperature which are too low. The atomic ratio Fe/(Fe+Co) in the memory layer $M_1$ is preferably from 0.85 to 0.95, and more preferably from 0.88 to 0.92. If this atomic ratio is too low, the Curie temperature becomes too high. Conversely, if the atomic ratio is too high, this results in too low a Curie temperature.

The thickness of the memory layer $M_1$ is preferably from 10 to 40 nm, and preferably from 15 to 30 nm. A memory layer $M_1$ that is too thin contributes little to the Kerr rotation angle, resulting in a low CNR, in addition to which the exchange coupling with the writing layer $W_2$ are too large for effective overwriting. On the other hand, a memory layer $M_1$ which is too thick results in exchange coupling with the writing layer $W_2$ that are too small for effective overwriting.

The memory layer $M_1$ preferably contains a nonmagnetic element. Adding a nonmagnetic element improves the output, thereby making it possible to increase the CNR. No particular limit is imposed on the type of nonmagnetic element, although it is advantageous to select at least one from among such elements as chromium, titanium, tantalum, molybdenum, tungsten, vanadium, zirconium, niobium, and aluminum. From the standpoint of enhancing corrosion resistance and reducing cost, including at least chromium is preferred, with the use of only chromium being most preferred.

Writing Layer $W_2$

Writing layer $W_2$ contains as primary components dysporium, iron and cobalt. The rare earth element content in this layer is 29 to 35 atomic percent, and preferably 30 to 33 atomic percent. If the rare earth element content is too low, initialization of the writing layer $W_2$ during high-power recording becomes difficult, resulting in a very low CNR with overwriting. On the other hand, too high a rare earth element content deprives the writing layer $W_2$ of a compensation temperature, causing the CNR to become very low, and even lower yet with overwriting.

The atomic ratio Fe/(Fe+Co) in the writing layer $W_2$ is from 0.40 to 0.58, and preferably from 0.45 to 0.55. Too low an atomic ratio results in a low CNR, and too high an atomic ratio leads to a very low CNR with overwriting.

The writing layer $W_2$ has a compensation temperature within a temperature range higher than room temperature, but lower than the temperature at which magnetization is copied to the memory layer $M_1$. The compensation temperature of the writing layer $W_2$ is preferably from 100 to 160° C.

The thickness of the writing layer $W_2$ is preferably from 15 to 40 nm, and more preferably from 20 to 35 nm. If the writing layer $W_2$ is too thin, exchange coupling with the memory layer $M_1$ become excessive for effective overwriting. On the other hand, if the writing layer $W_2$ is too thick, exchange coupling with the initializing layer $I_4$ become too small for effective initialization of the writing layer $W_2$.

Switching Layer $S_3$

The switching layer $S_3$ contains terbium and iron as primary components. The terbium content of the switching layer $S_3$ is preferably from 23 to 29 atomic percent, and more preferably from 24 to 27 atomic percent. A terbium content that is either too low or too high results in weak exchange coupling due to a decrease in the Curie temperature and a rise in the saturation magnetization.

The thickness of the switching layer $S_3$ is preferably from 5 to 15 nm, and more preferably from 8 to 12 nm. If the switching layer $S_3$ is too thin, the exchange coupling between the writing layer $W_2$ and the initializing layer $I_4$ fail to be adequately shielded. On the other hand, if the switching layer $S_3$ is too thick, the exchange coupling with the writing layer $W_2$ and the exchange coupling with the initializing layer $I_4$ become too small for effective initialization of the writing layer $W_2$.

Initializing Layer $I_4$

Initializing layer $I_4$ contains terbium and cobalt as primary components. The terbium content of the initializing layer $I_4$ is preferably from 21 to 28 atomic percent, and more preferably from 23 to 27 atomic percent.

The thickness of the initializing layer $I_4$ is preferably from 15 to 50 nm, and more preferably from 18 to 45 nm. An initializing layer $I_4$ that is too thin results in excessive exchange coupling with the writing layer $W_2$, which facilitates spin reversal, making it difficult to keep magnetization of the initializing layer $I_4$ oriented in one direction. Although a thick initializing layer $I_4$ poses no particular problems, because a thicker film entails higher film-forming costs, there is no need for the thickness to exceed 50 nm.

Figure 2:
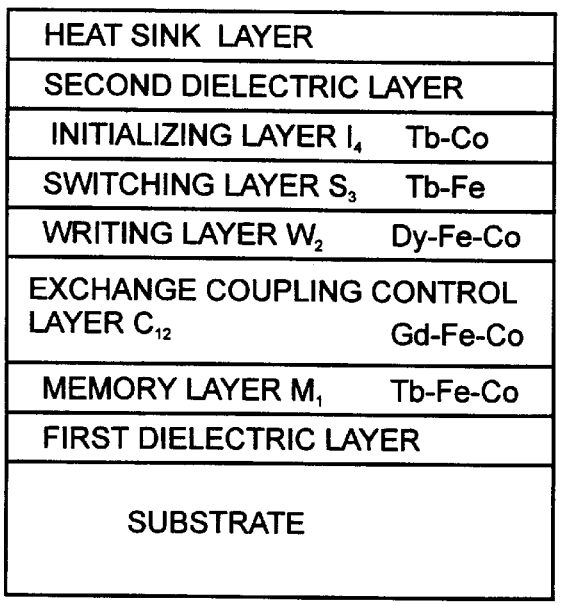
FIG. 2 is a schematic view showing another embodiment of the magneto-optical recording medium of the invention.

Embodiment in FIG. 2

FIG. 2 shows another embodiment of the magneto-optical recording medium of the present invention. Aside from having an exchange coupling control layer $C_{12}$ which is positioned between the memory layer $M_1$ and the writing layer $W_2$, and is in contact with both magnetic layers, the magneto-optical recording medium in FIG. 2 has essentially the same structure as the magneto-optical recording medium in FIG. 1.

Exchange coupling control layer $C_{12}$

The exchange coupling control layer $C_{12}$ is comprised of an amorphous alloy containing a rare earth element and a transition element.

The exchange coupling control layer $C_{12}$ is provided in order to control the exchange coupling between the memory layer $M_1$ and the writing layer $W_2$. It may be constituted in any manner so long as it has this effect. Preferable examples include the following:

(1) a layer containing a rare earth element and a transition element, wherein the axis of easy magnetization at room temperature is oriented within the plane of the layer, and a temperature at which the axis of easy magnetization becomes perpendicularly oriented exists within the range of from 100° C. up to the Curie temperature of the exchange coupling control layer $C_{12}$;

(2) a dielectric, such as various types of nitrides (e.g., silicon nitride, aluminum nitride) and various types of oxides (e.g., silicon oxide);

(3) a layer which contains a rare earth element and a transition element, and has been formed by reactive sputtering using a reactive gas such as oxygen or nitrogen;

(4) a layer comprising a nonmagnetic metal;

(5) a layer in which the axis of easy magnetization is oriented in-plane.

Of these, (1) is especially preferable. In the coupling strength-controlling layer $C_{12}$ described in (1) above, the orientation of the axis of easy magnetization changes near the compensation temperature for that layer. Referring to FIGS. 5 and 6, because the axis of easy magnetization in the exchange coupling control layer $C_{12}$ is oriented perpendicularly at the time that magnetization is copied from the writing layer $W_2$ to the memory layer $M_1$ by exchange coupling, this copy of magnetization readily takes place. Next, because the axis of easy magnetization in the exchange coupling control layer $C_{12}$ is oriented in-plane at the time that magnetization of the writing layer $W_2$ is reversed (initialization) by the initializing layer $I_4$, as mediated through the switching layer $S_3$, the exchange coupling between the memory layer $M_1$ and the writing layer $W_2$ can be shielded, thereby making it possible to prevent a change in the magnetized state of the memory layer $M_1$.

The exchange coupling control layers $C_{12}$ other than (1) above basically have the effect of lowering the exchange coupling between writing layer $W_2$ and memory layer $M_1$. Hence, providing this type of exchange coupling control layer $C_{12}$ makes it possible to protect the memory layer $M_1$ from influence when the magnetization of the writing layer $W_2$ is reversed (initialization).

When the exchange coupling control layer $C_{12}$ is comprised of a rare earth element and a transition element, in the case of layer (1) above in particular, the primary components are preferably gadolinium, iron, and cobalt, with a gadolinium content of 23 to 32 atomic percent, and especially 24 to 30 atomic percent, being advantageous. Too low a gadolinium content results in excessive exchange coupling with the other magnetic layers when the axis of easy magnetization is oriented perpendicularly, which makes overwriting difficult. On the other hand, too high a gadolinium content has the undesirable effect of weakening the exchange coupling with the other magnetic layers when the axis of easy magnetization is oriented perpendicularly. The atomic ratio Fe/(Fe+Co) in the case of layer (1) is preferably from 0.40 to 0.80, and more preferably from 0.50 to 0.60. If this atomic ratio is too small, the exchange coupling when the axis of easy magnetization is oriented perpendicularly become too low, and if this atomic ratio is too large, the Curie temperature becomes too low.

The thickness of the exchange coupling control layer $C_{12}$ is preferably from 5 to 30 nm, and more preferably from 8 to 20 nm. Too thin an exchange coupling control layer $C_{12}$ makes the exchange coupling difficult to control by the above-described effect, whereas if this layer is too thick, the exchange coupling with the other magnetic layers become too weak.

Embodiment in FIG. 3

FIG. 3 shows another embodiment of the magneto-optical recording medium of the present invention. Aside from having a readout layer $R_{01}$ which is positioned between the substrate and the memory layer $M_1$, and is in contact with the memory layer $M_1$, the magneto-optical recording medium shown in FIG. 3 has essentially the same structure as the magneto-optical recording medium in FIG. 1.

Readout Layer $R_{01}$

Readout layer $R_{01}$ is coupled with memory layer $M_1$ by exchange coupling, and is provided for the purpose of increasing the CNR.

This readout layer $R_{01}$ preferably is comprised of an amorphous alloy in which the primary components are gadolinium, iron, and cobalt. The gadolinium content of the readout layer $R_{01}$ is preferably from 23 to 27 atomic percent, and more preferably from 24 to 26 atomic percent. If the gadolinium content is too low or too high, the Curie temperature decreases, resulting in a lower CNR. The atomic ratio Fe/(Fe+Co) in the readout layer $R_{01}$ is preferably from 0.65 to 0.75, and more preferably from 0.68 to 0.73. If this atomic ratio is too small, the Kerr effect is diminished, resulting in a lower CNR. On the other hand, if the atomic ratio is too large, the Curie temperature decreases, likewise resulting in a lower CNR.

The thickness of the readout layer $R_{01}$ is preferably from 5 to 20 nm, and more preferably from 10 to 15 nm. Too thin a readout layer $R_{01}$ results in an insufficient increase in the CNR, whereas too thick a readout layer results in a decline in the coercivity of the memory layer $M_1$, rendering the overwriting characteristics unstable.

Embodiment in FIG. 4

Aside from having the exchange coupling control layer $C_{12}$ and readout layer $R_{01}$ described above, the magneto-optical recording medium shown in FIG. 4 has essentially the same structure as the magneto-optical recording medium shown in FIG. 1. When both an exchange coupling control layer $C_{12}$ and a readout layer $R_{01}$ are provided in this way, the effects conferred by each of these magnetic layers are realized together.

Each of the above-described magnetic layers may include as major components rare earth elements other than those already mentioned. The term "rare earth element," as used in this specification, refers to yttrium, scandium, and lanthanide elements. Each of the above-described magnetic layers may also include as major components transition elements other than those already mentioned.

In the various above-described embodiments, the thickness of the magnetic multilayer stack preferably does not exceed 150 nm. At a magnetic multilayer stack thickness greater than 150 nm, it is difficult to achieve a high recording sensitivity.

Substrate

When writing and reading are carried out on a magneto-optical recording medium, laser light is applied from the back side (memory layer $M_1$ side) of the substrate. Therefore, it is preferred that the substrate be transparent to laser light (wavelength, about 400 to 900 nm). Suitable substrates include transparent resins such as polycarbonate, acrylic resin, amorphous polyolefin, and styrene resin, as well as glasses.

First and Second Dielectric Layers

The first and second dielectric layers are provided for the purpose of increasing the CNR and preventing corrosion of the magnetic layers. Moreover, in cases where a heat sink layer is provided, the second dielectric layer also serves to store the heat of the writing layer that arises during writing, and to copy this heat to the heat sink layer.

The thickness of the second dielectric layer is not subject to any particular limits, and may generally be from 5 to 100 nm, although a thickness of 13 to 30 nm is used for achieving the fourth object mentioned above. If the second dielectric layer is too thin, heat copy from the magnetic multilayer stack to the heat sink layer takes place too readily, resulting in a lower recording sensitivity. This in turn causes the recording power required for high-power recording to become too high, in addition to which the recording power required for low-power recording also rises, thus reducing the recording power margin during low-power recording. On the other hand, a second dielectric layer that is too thick discourages heat copy from the magnetic multilayer stack to the heat sink layer, thereby reducing the recording power margin during low-power recording.

No particular limits are imposed on the thickness of the first dielectric layer, although it is generally preferable for this to be from 30 to 100 nm.

Each of the dielectric layers may be comprised of a suitable substance such as an oxide, a nitride, or a mixture thereof. Examples of these substances include silicon oxide, silicon nitride, aluminum nitride, and SiAlON. However, the thickness limits mentioned above for the second dielectric layer are particularly effective when the second dielectric layer is comprised of silicon nitride, and specifically $Si_xN_{1-x}$ (wherein x is from 0.35 to 0.55).

Heat sink layer

The heat sink layer serves to dissipate heat from the magnetic multilayer stack during recording, and may be provided if necessary, although it is essential for realizing the fourth object mentioned above. There are no particular limits on the thickness of the heat sink layer. It is generally advantageous for this to be from 20 to 80 nm, although to achieve the first object mentioned above, the thickness is set at from 30 to 60 nm, and preferably from 30 to 50 nm. If the heat sink layer is too thin, heat dissipation becomes insufficient, as a result of which heat builds up in the writing layer, and the recording power margin during low-power recording becomes small. On the other hand, if the heat sink layer is too thick, heat dissipates too easily, resulting in a low recording sensitivity. This makes the recording power required for high-power recording too high, in addition to which the recording power required for low-power recording also rises, leading to a smaller recording power margin during low-power recording.

The heat sink layer is composed of metal (including alloys). The material making up the heat sink layer is preferably aluminum, gold, silver, or copper, an alloy containing at least one of these, or a material obtained by the addition to these of a suitable amount of an additional element such as nickel, titanium, chromium, zinc, or cobalt.

The thickness limits mentioned above are particularly effective when this layer is composed of an aluminum-nickel alloy (nickel content, 3 to 10% by weight).

Protective Layer

Advantageously, a protective layer composed of a resin such as a UV-curable resin is provided on the surface of the heat sink layer. The thickness of the protective layer is preferably from 1 to 30 µm. A similar protective layer may also be provided on the back side of the substrate.

EXAMPLES

Example 1

A magneto-optical recording disk (sample No. 101) having the structure shown in FIG. 1 was produced by the following procedure using as the substrate a polycarbonate disk (track pitch, 1.1 µm) having an outside diameter of 120 mm and a thickness of 1.2 mm.

First Dielectric Layer

A silicon nitride film was formed as the first dielectric layer by a sputtering process with a silicon target in an argon-nitrogen atmosphere. The thickness of this layer was set at 60 nm.

Magnetic Layers in Magnetic Multilayer Stack

These layers were formed by a sputtering process in an argon atmosphere.

Second Dielectric Layer

This layer was formed in the same way as the first dielectric layer. The thickness was set at 10 nm.

Heat sink layer

This was formed by a sputtering process from an aluminum-nickel target in an argon atmosphere. The thickness was set at 40 nm.

Protective Layer

UV-curable resin was applied by a spin-coating process, then cured using UV irradiation to form a protective layer. The thickness of this layer was set at about 5 µm.

The composition, thickness and Curie temperatures (Tc) of each of the magnetic layers are shown in Table 1. For those layers having a compensation temperature, this compensation temperature (Tcomp) is also shown in Table 1. The compositions of the magnetic layers were measured with an Auger analyzer following the evaluation of characteristics which is subsequently described. The thicknesses of the magnetic layers were computed from the sputter rate and the sputtering time. To determine the sputter rate, sputtering was carried out for an extended duration under the same conditions as during actual film formation, thereby forming a thick film. The sputter rate was then computed from the measured thickness of this film and the sputtering time.

TABLE 1

| Magnetic layer | Composition (atom %) | Thickness (nm) | Tc (°C.) | Tcomp (°C.) |
|---|---|---|---|---|
| Memory layer $M_1$ | $Tb_{22}Fe_{68}Co_7Cr$ | 25 | 180 | — |
| Writing layer $W_2$ | $Dy_{30}Fe_{35}Co_{35}$ | 30 | 280 | 120 |
| Switching layer $S_3$ | $Tb_{25}Fe_{75}$ | 10 | 150 | 20 |
| Initializing layer $I_4$ | $Tb_{26}Co_{74}$ | 40 | >300 | 180 |

Next, magneto-optical recording disk samples were fabricated in the same manner as above Sample No. 101, except that the dysprosium content and atomic ratio Fe/(Fe+Co) for recording layer $W_2$ were set as shown in Table 2. The Curie temperature ($Tc_{W2}$) and compensation temperature ($Tcomp_{W2}$) of the writing layer $W_2$ in each of these samples are shown in Table 2. The compositions of the writing layer $W_2$ for each of the samples was measured by Auger analysis. The composition of writing layer $W_2$ was adjusted by attaching dysprosium, iron, and cobalt chips to the sputtering target.

Evaluation of Characteristics

Each of the samples was evaluated using an optical disk evaluating apparatus. The measurement conditions are shown below.

Laser wavelength: 680 nm

Numerical aperture (NA): 0.55

Recording power: high-power recording, 13 mW; low-power recording, 4 mW

Reading power: 1.5 mW

Bias magnetic field: 300 Oe

Relative linear velocity: 7.4 m/s

Recording pattern: pulse splitting technique (20 ns (on), 152 ns (off))

The initial CNR obtained from these measurements and the CNR after 10,000 overwrite cycles are shown in Table 2.

TABLE 2

| | Composition | | | | CNR (dB) | |
|---|---|---|---|---|---|---|
| Sample No. | Dy (atom %) | Fe/(Fe + Co) | $Tc_{w2}$ (° C.) | $Tcomp_{w2}$ (° C.) | Initial | After 10,000 cycles |
| 101 | 30 | 0.5 | 280 | 120 | 46 | 46 |
| 102 | 29 | 0.5 | 290 | 100 | 46 | 45 |
| 103 | 35 | 0.5 | 260 | 160 | 45 | 45 |
| 104 | 30 | 0.4 | 290 | 160 | 46 | 45 |
| 105 | 30 | 0.55 | 270 | 150 | 46 | 45 |
| 106 (comp.) | 26* | 0.5 | 290 | 80 | 46 | 42 |
| 107 (comp.) | 37* | 0.5 | 270 | — | 40 | 38 |
| 108 (comp.) | 30 | 0.3* | 310 | 190 | 43 | 42 |
| 109 (comp.) | 30 | 0.7* | 250 | 180 | 45 | 40 |

*Outside the limited range

The effects of the present invention are apparent from Table 2. That is, in the samples for which the dysprosium content and the atomic ratio Fe/(Fe+Co) for writing layer $W_2$ fall within the scope of this invention, the initial CNR and the CNR after overwriting are both good. However, in the samples for which the dysprosium content and the atomic ratio Fe/(Fe+Co) fall outside the scope of the invention, either the initial CNR is very poor or the CNR drops off significantly with overwriting.

Example 2

A magneto-optical recording disk (Sample No. 201) having the structure shown in FIG. 4 was fabricated.

The composition, thickness and Curie temperature (Tc) of each of the magnetic layers are shown in Table 3. For those layers having a compensation temperature, the compensation temperature is also shown in Table 3. In the exchange coupling control layer $C_{12}$, the axis of easy magnetization is oriented in-plane on the low-temperature side from the vicinity of this compensation temperature, and is oriented perpendicularly on the high-temperature side.

TABLE 3

| Magnetic layer | Composition (atom %) | Thickness (nm) | Tc (°C.) | Tcomp (°C.) |
|---|---|---|---|---|
| Readout layer $R_{01}$ | $Gd_{25}Fe_{53}Co_{22}$ | 14 | >300 | — |
| Memory layer $M_1$ | $Tb_{22}Fe_{68}Co_7Cr_3$ | 18 | 180 | — |
| Exchange coupling control layer $C_{12}$ | $Gd_{27}Fe_{46}Co_{27}$ | 10 | >300 | 150 |
| Writing layer $W_2$ | $Dy_{30}Fe_{35}Co_{35}$ | 30 | 280 | 120 |
| Switching layer $S_3$ | $Tb_{25}Fe_{75}$ | 10 | 150 | 20 |
| Initializing layer $I_4$ | $Tb_{26}Co_{74}$ | 40 | >300 | 180 |

For the sake of comparison, Sample No. 202 was fabricated so as to be identical to Sample No. 201, except that the composition (atomic ratio) of the memory layer $M_1$ was made $Tb_{23}Fe_{69}Co_8$. That is, chromium was not added to the memory layer $M_1$.

The carrier-to-noise ratios for these samples were measured. The results are shown in Table 4. Table 4 also shows the saturation magnetization (Ms) of the memory layer $M_1$ in each sample. To determine this value, a measurement sample having only a memory layer $M_1$ was fabricated, and the Ms was measured with a vibrating sample magnetometer (VSM).

TABLE 4

| Sample No. | Saturation magnetization (Ms) of memory layer $M_1$ (emu/cm³) | CNR (dB) |
|---|---|---|
| 201 | 80 | 45.5 |
| 202 | 150 | 44.0 |

From Table 4, it is apparent that the CNR rises with the addition of chromium to the memory layer $M_1$. This rise in the CNR is attributable to a rise in the output.

Example 3

Magneto-optical recording disks having the structure shown in FIG. 1 were fabricated in the manner described below using as the substrate a polycarbonate disk (track pitch, 1.1 μm) having an outside diameter of 120 mm and a thickness of 1.2 mm, and setting the thicknesses of the second dielectric layer and the heat sink layer as shown in Table 6.

First Dielectric Layer

A silicon nitride ($Si_3N_4$) film was formed as the first dielectric layer by sputter-deposition from a silicon target in an argon-nitrogen atmosphere. The film thickness was set at 60 nm.

Magnetic Layers of Magnetic Multilayer Stack

Each of the magnetic layers was formed by sputtering in an argon atmosphere.

Second Dielectric Layer

This layer was formed in the same manner as the first dielectric layer.

Heat sink layer

This was formed by sputtering from an aluminum-nickel alloy (nickel content, 6% by weight) target in an argon atmosphere.

Protective Layer

A UV-curable resin was applied by spin-coating, then cured by ultraviolet irradiation to give a protective layer. The thickness of this layer was set at about 5 μm.

The composition, thickness, and Curie temperature (Tc) of each magnetic layer are shown in Table 5. For those layers having a compensation temperature, the compensation temperatures (Tcomp) are also shown in Table 5. The compositions of the magnetic layers were measured with an Auger analyzer following the evaluation of characteristics which is described below. The thicknesses of the magnetic layers were computed from the sputter rate and the sputtering time. To determine the sputter rate, sputtering was carried out for an extended period of time under the same conditions as during actual film formation, thereby forming a thick film. The sputter rate was then computed from the measured thickness of this film and the sputtering time.

TABLE 5

| Magnetic layer | Composition (atom %) | Thickness (nm) | Tc (°C.) | Tcomp (°C.) |
|---|---|---|---|---|
| Memory layer $M_1$ | $Tb_{22}Fe_{68}Co_7Cr$ | 25 | 180 | — |
| Writing layer $W_2$ | $Dy_{30}Fe_{35}Co_{35}$ | 30 | 280 | 120 |
| Switching layer $S_3$ | $Tb_{25}Fe_{75}$ | 10 | 150 | 20 |
| Initializing layer $I_4$ | $Tb_{26}Co_{74}$ | 40 | >300 | 180 |

Evaluation of Characteristics

The recording power margin for each sample was measured using an optical disk evaluating apparatus. The measurement conditions were as follows.

Laser wavelength: 680 nm

Numerical aperture (NA): 0.55

Reading power: 1.5 mW

Bias magnetic field: 300 Oe

Relative linear velocity: 7.4 m/s

Recording pattern: pulse splitting technique (20 ns (on), 152 ns (off))

The recording power margin was defined as the range over which a CNR of at least 45 dB was obtained. Table 6 shows both the range in the recording power $P_L$ over which a CNR of at least 45 dB was obtained during low-power recording, and also the range in the recording power $P_H$ over which a CNR of at least 45 dB was obtained during high-power recording.

TABLE 6

| Sample No. | Thickness (nm) Second dielectric layer | Heat sink layer | $P_L$ (mW) | $P_H$ (mW) |
|---|---|---|---|---|
| 301 | 15 | 40 | 2.5–4.5 | >9 |
| 302 | 20 | 40 | 2.5–4.0 | >9 |
| 303 (comp.) | 10* | 40 | 3.5–4.5 | >10 |
| 304 (comp.) | 40* | 40 | 2.5–3.0 | >9 |
| 305 (comp.) | 15 | 20* | none | none |
| 306 (comp.) | 15 | 80* | 3.5–4.5 | >11 |

*Outside the limited range

The effects of the present invention are apparent from Table 6. That is, magneto-optical recording media in which the thickness of the second dielectric layer and the thickness of the heat sink layer fall within the scope of the present invention have a broad recording power margin during low-power recording, in addition to which recording at a relatively low power is possible during high-power recording. However, in Sample No. 303 having a second dielectric layer that is too thin, and Sample No. 306 having a dissipating layer whose thickness exceeds the range according to the present invention, the recording power margin during low-power recording is clearly narrower and the recording power required for high-power recording is higher. Also, Sample No. 304, in which the thickness of the second dielectric layer is above the range according to the present invention, has a narrow recording power margin during low-power recording. And Sample No. 305, in which the thickness of the heat sink layer is below the range according to the present invention, fails to achieve a CNR of at least 45 dB.

Of the samples shown in Table 6, those samples falling within the scope of the present invention achieved CNR of at least 45 dB even after 10,000 overwrite cycles.

We claim:

1. A light intensity-modulation direct overwrite magneto-optical recording medium comprising a magnetic multilayer stack on a surface side of a substrate, which magnetic multilayer stack includes four magnetic layers, these being, in order from the substrate side, a memory layer $M_1$, a writing layer $W_2$, a switching layer $S_3$, and an initializing layer $I_4$, each of said magnetic layers containing a rare earth element and a transition element and having perpendicular magnetic anisotropy at room temperature, with neighboring magnetic layers being coupled to each other by exchange coupling, wherein said magnetic layers satisfy:

$$Tc_{I4} > Tc_{W2} > Tc_{M1} \text{ and } Tc_{I4} > Tc_{W2} > Tc_{S3}; \text{ and}$$

wherein $Tc_{M1}$ is the Curie temperature of the memory layer $M_1$, $Tc_{W2}$ is the Curie temperature of the writing layer $W_2$, $Tc_{S3}$ is the Curie temperature of the switching layer $S_3$, and $Tc_{I4}$ is the Curie temperature of the initializing layer $I_4$, and the writing layer $W_2$ is composed mainly of dysprosium, iron, and cobalt, has a rare earth element content of 29 to 35 atomic percent, and has an atomic ratio Fe/(Fe+Co) of from 0.40 to 0.58.

2. The magneto-optical recording medium of claim 1, wherein the memory layer $M_1$ is composed mainly of terbium, iron and cobalt, contains from 21 to 25 atomic percent of terbium, and has an atomic ratio Fe/(Fe+Co) of from 0.85 to 0.95;

the switching layer $S_3$ is composed mainly of terbium and iron, and contains from 23 to 29 atomic percent of terbium; and the initializing layer $I_4$ is composed mainly of terbium and cobalt, and contains from 21 to 28 atomic percent of terbium.

3. The magneto-optical recording medium of claim 1, herein the memory layer $M_1$ has a thickness of 10 to 40 nm, the writing layer $W_2$ has a thickness of 15 to 40 nm, the switching layer $S_3$ has a thickness of 5 to 15 nm, and the initializing layer $I_4$ has a thickness of 15 to 50 nm.

4. The magneto-optical recording medium of claim 1 comprising an exchange coupling control layer $C_{12}$ between the memory layer $M_1$ and the writing layer $W_2$.

5. The magneto-optical recording medium of claim 4, wherein the exchange coupling control layer $C_{12}$ is a magnetic layer comprised of an amorphous alloy containing a rare earth element and a transition element.

6. The magneto-optical recording medium of claim 5, wherein the axis of easy magnetization in the exchange coupling control layer $C_{12}$ is oriented in-plane at room temperature, and a temperature at which the axis of easy magnetization in the exchange coupling control layer $C_{12}$ becomes perpendicularly oriented exists within the range of from 100° C. to the Curie temperature of the exchange coupling control layer $C_{12}$.

7. The magneto-optical recording medium of claim 5, wherein the exchange coupling control layer $C_{12}$ includes as primary components gadolinium, iron and cobalt, contains from 23 to 32 atomic percent of gadolinium, and has an atomic ratio Fe/(Fe+Co) of from 0.40 to 0.80.

8. The magneto-optical recording medium of claim 4, wherein the thickness of the exchange coupling control layer $C_{12}$ is from 5 to 30 nm.

9. The magneto-optical recording medium of claim 1 comprising a readout layer $R_{O1}$ that is a magnetic layer between the substrate and the memory layer $M_1$, said readout layer $R_{O1}$ being comprised of an amorphous alloy containing as primary components gadolinium, iron and cobalt, and coupled with the memory layer $M_1$ by exchange coupling.

10. The magneto-optical recording medium of claim 9, wherein the readout layer $R_{O1}$ contains from 23 to 27 atomic percent of gadolinium and has an atomic ratio Fe/(Fe+Co) of from 0.65 to 0.75.

11. The magneto-optical recording medium of claim 9, wherein the readout layer $R_{O1}$ has a thickness of 5 to 20 nm.

12. The magneto-optical recording medium of claim 1, wherein the memory layer $M_1$ contains a nonmagnetic element.

13. The magneto-optical recording medium of claim 12, wherein the nonmagnetic element contained in the memory layer $M_1$ is at least one from among chromium, titanium, tantalum, molybdenum, tungsten, vanadium, zirconium, niobium, and aluminum.

14. The magneto-optical recording medium of claim 1 comprising a first dielectric layer on the back side of said magnetic multilayer stack and comprising a second dielectric layer and a heat dissipating layer, in this order, on the surface side of the magnetic multilayer stack, wherein the heat sink layer is comprised of metal, the second dielectric layer has a thickness of 13 to 30 nm, and the heat dissipating layer has a thickness of 30 to 60 nm.

* * * * *